July 7, 1970  C. D. RUSSELL  3,519,335
REARVIEW MIRROR ADAPTER FOR ANGLING THE MIRROR BY REMOTE CONTROL
Filed Oct. 31, 1966  2 Sheets-Sheet 1

INVENTOR
CARL D. RUSSELL

BY *Wilfred G. Caldwell*

ATTORNEY

July 7, 1970     C. D. RUSSELL     3,519,335
REARVIEW MIRROR ADAPTER FOR ANGLING THE MIRROR BY REMOTE CONTROL
Filed Oct. 31, 1966     2 Sheets-Sheet 2
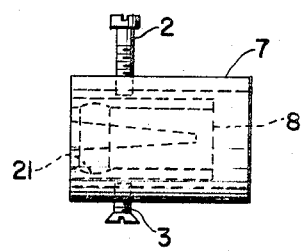
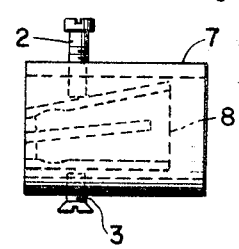
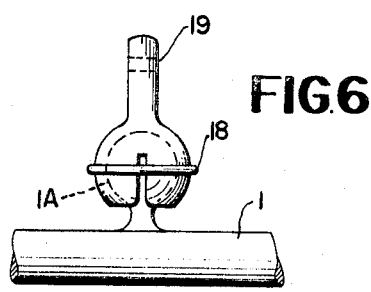
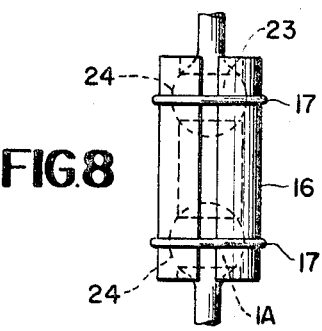
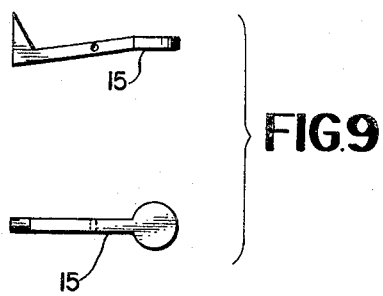
INVENTOR
CARL D. RUSSELL
BY *Wilfred G. Caldwell*
ATTORNEY United States Patent Office 3,519,335
Patented July 7, 1970

3,519,335
REARVIEW MIRROR ADAPTOR FOR ANGLING THE MIRROR BY REMOTE CONTROL
Carl D. Russell, Muskogee, Okla., assignor, by mesne assignments, to Engineering Automotive Sciences Inc., a corporation of Maryland
Filed Oct. 31, 1966, Ser. No. 590,801
Int. Cl. G02b 5/08
U.S. Cl. 350—289                    3 Claims

ABSTRACT OF THE DISCLOSURE

The invention discloses a device for angling a conventional vehicular rearview mirror comprising a box-like structure provided for housing a pair of electromagnets and including a pivotly connected receiving structure. The receiving structure receives the mirror extension and the housing further includes a ball which may be gripped by the vehicle integral structure for supporting the mirror and housing for adjustable movement.

---

Figure 1:
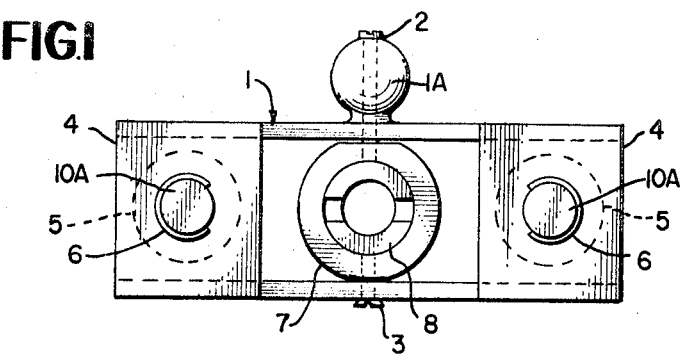

The present invention relates to a device for angling a conventional vehicular rearview mirror in order to avoid blind areas, particularly when the vehicle is being turned to the right or left. While numerous inventions have been made in the field, the present invention is in the nature of a universal adaptor for use with most existing mirror support structures, i.e., for connection to that part affixed permanently to the vehicle. In addition, the present invention provides a much simpler, less expensive and more effective apparatus for achieving the desired result.

The apparatus of this invention enables the mirror to be angled to the right or to the left in accordance with the operation of the turn indicator signal lever. It achieves this action through the use of a pair of electromagnets selectively actuated from the electrical system of the car, under the control of the turn indicator signal lever in either signalling position. A right-hand turn indication energizes one magnet and a left-hand turn indication energizes the other magnet thereby causing the mirror to be angled in one direction or the other, the mirror being pivotly mounted relative to the electromagnet supporting structure.

Basically, a box-like structure is provided for housing the electromagnets and for receiving a pivot mounting mirror extension shaft. In turn, the housing carries a ball which may be gripped for establishing a universal connection thereto from the vehicle attachment.

The invention contemplates the use of inexpensive plastic connectors comprising merely either a bifurcated or a slotted tube with inner recessed circular area or areas to receive a ball or rod and including an outer housing or equivalent through which clamping means may compress and split plastic tube about the ball or rod to be gripped, with the ball lying in the relieved circular areas thereby providing good gripping.

Another feature of the invention resides in the provision of locking fingers, respectively provided for each electromagnet, and operative by associated electromagnet to fix the position of the pivotal structure carried by the box in cooperation with the electromagnet drawing the mirror thereto. Additionally, the opposite locking finger cooperates in the same function by virtue of a locking finger spring normally biasing each locking finger in the direction of the pivotal structure. Of course, the energized electromagnet is sufficiently strong as to overcome the locking spring for its associated locking finger.

With the foregoing in mind, it is among the objects of this invention to provide a universal adaptor for positioning a pair of electromagnets relative to a vehicular mirror while affording a pivotal connection between the mirror and the electromagnet and a universal connection between the mirror and the vehicle.

It is a further object of the invention to provide such an arrangement including cooperating locking fingers.

A still further object of the invention is the provision of such an adaptor capable of universal connection, to a rod or ball type connector.

Figure 2:
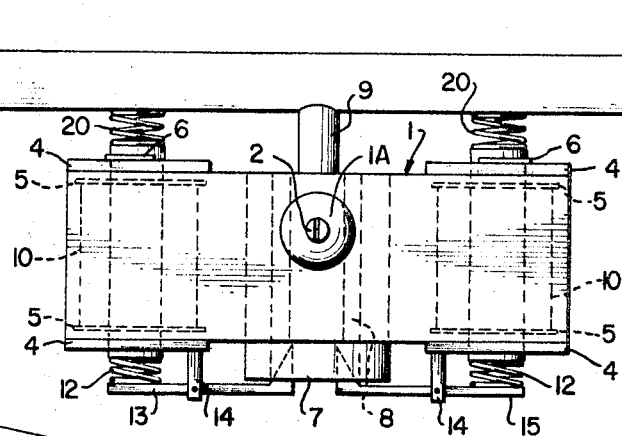
Figure 3:
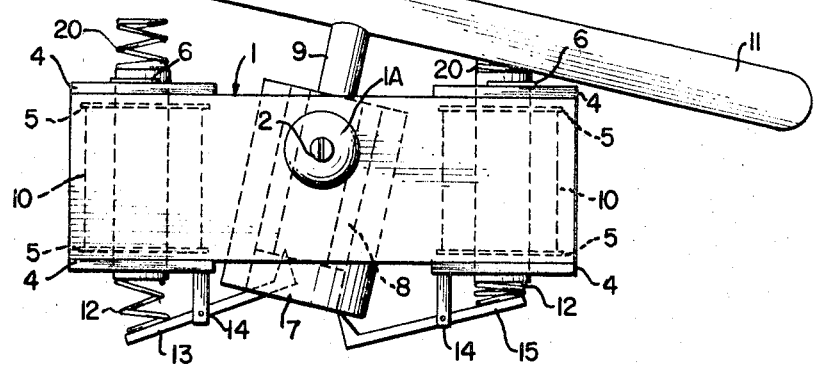
Figure 4:
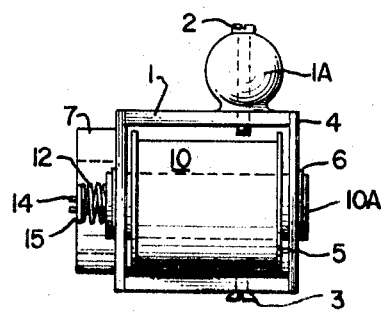

The invention will be better understood from a consideration of the appended drawings in which:

FIG. 1 is a view in elevation of the box supporting structure, without the mirror, FIG. 2 is a view in top plan of the box supporting structure with the mirror carried thereby, FIG. 3 shows the structure of FIG. 2 with the mirror angled to the right, FIG. 4 is a view in end elevation of the structure of FIG. 1, FIG. 5 shows a suitable connector structure for use with the present invention, as seen in side elevation, FIG. 6 is an elevational showing of a different type connector in association with the box ball, FIG. 7 shows the connector of FIG. 5, squeezed together as in a gripping relation, FIG. 8 shows a still further type connector in elevavation, and FIG. 9 shows the locking finger in side elevation and in plan.

Referring now to the drawings, and particularly to FIGS. 1 through 4, it may be seen that a housing or case 1 is provided which is generally ultimately in the form of a box, except that two opposite side walls are open in the center to accommodate shaft locking means 8 and pivoting hub 7 and the ends are open, in order that the electromagnetic coils 10, carried on spools 5, may be readily inserted in the positions shown, and secured by plates 4, wielded or otherwise affixed to the case 1 to support the former.

The top of the case 1 is provided with a ball 1A through which a pivot and clamp screw 2 extends vertically to apply pressure to shaft locking means 8, shown as a split plastic tube, better seen in detail in FIGS. 5 and 7.

The cores 10A for the electromagnets protrude through opposite openings in the plates 4 so that they are exposed beyond the case 1. One or more locking rings 6 retain this assembly.

Bottom pivot screw 3 (FIGS. 1 and 4) is provided in order that the sleeve 8 may be compressed, from opposite directions, thereby maintaining shaft 9 of mirror case 11 centrally disposed in hub 7. Centering springs 20 are shown disposed between plates 4 and the mirror case 11 to return the mirror to its normal position when both coils 10 are de-energized. The springs 20 may be spiral or cylindrical and may be affixed to plates 4 or the mirror case 11.

It may be appreciated that the pivot, established by pivot and clamp screw 2, enables the mirror case 11 to be angled in the direction of either electromagnet, as is best seen in FIG. 3 for our orientation.

A pair of locking fingers 13 and 15 is provided with the rear plates 4 being provided with yokes 14 in which the fingers 13 and 15 and pivotally mounted. Fingers 13 and 15 are normally urged to the position shown in FIG. 2 by springs 20, preferably affixed to back plates 4. Examination of finger 15, as best seen in FIG. 9, shows that one end carries a tapered pushing portion and the opposite end terminates in a circular area, substantially conforming in size to core 10A (see FIG. 3). The material of the fingers is magnetizable and, as may be seen in FIG. 3, when the right-hand coil 10 is energized, it pulls both the mirror case 11 and the rear portion of locking finger 15 toward it, the magnetic forces being sufficient to overcome righthand finger locking spring 12. However, left-hand spring 12 urges locking finger 13 in the opposite direction, such that that mirror case 11 is instantly locked into position. The advantage of the locking fingers resides in the elimination of any tendency of oscillation or vibration in movement of mirror case 11.

Looking now at the detailed showing of FIGS. 5 through 9, it should be pointed out that the pivoting hub 7 is preferably a nylon tube and the shaft locking means 8 is a plastic tube, split as shown. In FIG. 7, screws 2 and 3 have been turned inwardly to compress the bifurcated sleeve 8. The inner surface of the shaft locking sleeve 8 is relieved away in a circular peripheral area 21 in order that this connection may securely accommodate a ball, as well as a shaft.

FIGS. 6 and 8 are provided to show connections presently useful for installing the present apparatus in General Motors and Ford products, respectively. In FIG. 6, the ball 1A of case 1 is gripped by the bifurcated gripper 19, already installed in the vehicle. A tightening band 18 of spring wire is provided to insure this connection.

In FIG. 8, a tube 16 enables a connection between the two balls, the lower ball being 1A of the adaptor and the upper ball 23 being the vehicle fixed structure. In this case, the sleeve 16 is not bifurcated but rather is split longitudinally at one location only. It also includes the relieved circular areas 24 for gripping the balls 1A and 23 with the bands 17 being provided to insure the engagement.

In operation, the electromagnets 10 are selectively energizing in response to the position of the turn indicator signal lever. Any number of circuits may be designed to operate or energize these magnets and it is not the purpose of this application to cover such circuitry, but rather the adaptor hardware. For example, a suitable circuit is illustrated and described in my co-pending application Ser. No. 589,608 filed Oct. 26, 1966.

It may now be appreciated that the locking fingers 13 and 15 comprise a further feature of the invention in that when the mirror is in the normal position, shown in FIG. 2, the fingers are both effective to lock it in that position, which enables the operator then to adjust the mirror for his own viewing area, i.e., tilt it higher or lower or to either side through the universal connection between the mirror and the vehicle.

What I claim is:

1. An adaptor assembly for connection between a vehicle rearview mirror case carrying a reflector and the vehicle support therefore to angle the mirror to the left and right about a vertical axis from a centered position in response to operation of the vehicular turn signal using energy from the vehicular electrical system comprising in combination: a frame, a pair of electromagnets carried by the frame in spaced apart locations and energizable from the electrical system; means pivotally connecting the mirror case to the frame with said electromagnets disposed in proximity to the mirror case to operate upon the mirror case; said connecting means being fixed to the mirror case and pivotally attached to the frame; means supported by the frame for connection to the vehicle support to enable universal movement to adjust the adaptor assembly relative to the vehicle; spring means to center the mirror case; means for locking said mirror case to the frame against pivotal movement; said means for locking comprising a pair of fingers pivotally carried by the frame adjacent the electromagnets which fingers engage the connecting means to lock the mirror case in the centered position only in the absence of energization of either electromagnet.

2. The device of claim 1 wherein said means for connecting the mirror case to the frame comprises a bifurcated tubular clamping member; a peripheral housing for the clamping member; and means carried by the housing for compressing the clamping member.

3. The device of claim 2 wherein said locking means further comprises means normally urging the locking fingers to grip the clamping member; and each of said electromagnets when selectively energized releasing its associated locking finger.

References Cited

UNITED STATES PATENTS

| 606,914 | 7/1898 | Bragger | 287—89 |
| 813,638 | 2/1906 | Fretts | 335—253 X |
| 1,202,698 | 10/1916 | Ford | 287—89 X |
| 1,290,252 | 1/1919 | Lester et al. | 287— 89 X |
| 1,685,544 | 9/1928 | Hodny | 287—89 X |
| 2,638,035 | 5/1953 | MacGeorge et al. | 350—289 |
| 2,806,408 | 9/1957 | Moeller | 350—279 |
| 3,059,539 | 10/1962 | Meade | 350—281 |
| 3,144,226 | 8/1964 | Noble | 335—254 X |
| 3,199,075 | 8/1965 | Simmons | 350—289 X |

FOREIGN PATENTS

| 211,691 | 10/1960 | Austria. |
| 838,752 | 12/1938 | France. |

DAVID SCHONBERG, Primary Examiner

J. W. LEONARD, Assistant Examiner

U.S. Cl. X.R.

248—481; 287—89; 335—254; 350—307